US008668389B2

(12) United States Patent
Plasse

(10) Patent No.: US 8,668,389 B2
(45) Date of Patent: Mar. 11, 2014

(54) COMBINATION THRUST FLANGE AND THRUST PLATE

(75) Inventor: Ernest W. Plasse, Mystic, CT (US)

(73) Assignee: Davis-Standard, LLC, Pawcatuck, CT (US)

( * ) Notice: Subject to any disclaimer, the term of this patent is extended or adjusted under 35 U.S.C. 154(b) by 99 days.

(21) Appl. No.: 13/182,574

(22) Filed: Jul. 14, 2011

(65) Prior Publication Data

US 2012/0008894 A1    Jan. 12, 2012

Related U.S. Application Data

(63) Continuation-in-part of application No. 10/012,980, filed on Nov. 5, 2001, now Pat. No. 7,993,062.

(51) Int. Cl.
*F16C 19/10* (2006.01)
*F16C 19/30* (2006.01)
*F16C 19/54* (2006.01)
*F16C 33/46* (2006.01)
*F16C 33/58* (2006.01)

(52) U.S. Cl.
USPC .......... 384/454; 384/608; 384/609; 384/614; 384/615

(58) Field of Classification Search
USPC ......... 384/452–455, 590, 609, 614, 615, 618, 384/621, 622, 619; 366/77, 78, 83
See application file for complete search history.

(56) References Cited

U.S. PATENT DOCUMENTS

| | | | |
|---|---|---|---|
| 628,526 A * | 7/1899 | Cliff | 384/596 |
| 673,220 A | 4/1901 | Perkins | |
| 1,218,312 A | 3/1917 | Perkins | |
| 2,030,104 A | 2/1936 | Eksergian | |
| 2,118,760 A | 5/1938 | Ernst | |
| 2,374,820 A * | 5/1945 | Kaye | 384/619 |
| 2,539,683 A | 1/1951 | Ablett | |
| 2,584,652 A * | 2/1952 | Antony | 384/608 |
| 2,659,305 A | 11/1953 | Giori | |

(Continued)

FOREIGN PATENT DOCUMENTS

| | | |
|---|---|---|
| JP | 5066058 | 6/1975 |
| JP | 2009180235 A | 8/2009 |
| WO | 0238956 A2 | 5/2002 |

OTHER PUBLICATIONS

International Search Report issued in corresponding PCT Application No. PCT/US2012/046581 dated Jan. 9, 2013.

*Primary Examiner* — Phillip A Johnson
(74) *Attorney, Agent, or Firm* — MKG, LLC

(57) ABSTRACT

A thrust bearing assembly includes a single-piece thrust plate and thrust shaft flange having a generally cylindrical body portion, a frustoconical body portion and a bore extending through the cylindrical body portion and the frustoconical body portion. The bore defines a first bore section and a second bore section. A lip extends between the first and second bore sections. The first bore section, the second bore section and the lip are configured to receive a thrust shaft and axial thrust forces transmitted therefrom. The thrust bearing assembly also includes a bearing assembly in operable communication with the single-piece thrust plate and thrust shaft flange. The bearing assembly supports rotation of the thrust shaft and includes a plurality of first rolling elements. The bearing assembly includes a bearing cage to retain the first rolling elements and a plurality of second rolling elements disposed between the bearing cage and the thrust shaft.

9 Claims, 6 Drawing Sheets

(56) References Cited

U.S. PATENT DOCUMENTS

| | | | |
|---|---|---|---|
| 2,726,070 A * | 12/1955 | Tudor | 366/305 |
| 3,023,058 A | 2/1962 | Bowers et al. | |
| 3,375,549 A | 4/1968 | Geyer | |
| 3,414,341 A | 12/1968 | Murphy | |
| 3,712,693 A * | 1/1973 | Root et al. | 384/619 |
| 3,795,456 A | 3/1974 | Schafer | |
| 3,829,181 A * | 8/1974 | Gunther et al. | 384/455 |
| 3,923,290 A | 12/1975 | Tillis | |
| 3,934,956 A | 1/1976 | Pitner | |
| 4,033,556 A | 7/1977 | Anders | |
| 4,042,284 A | 8/1977 | Coster | |
| 4,124,256 A | 11/1978 | de Senneville | |
| 4,304,539 A | 12/1981 | Hagiwara et al. | |
| 4,320,928 A * | 3/1982 | Chszaniecki | 384/128 |
| 4,517,858 A | 5/1985 | Schafer | |
| 4,718,840 A * | 1/1988 | Inaba et al. | 425/145 |
| 4,859,166 A | 8/1989 | Hamada et al. | |
| 4,971,460 A * | 11/1990 | Muntnich et al. | 384/452 |
| 5,150,973 A | 9/1992 | Masur et al. | |
| 5,261,750 A | 11/1993 | Eckhardt et al. | |
| 5,545,024 A | 8/1996 | Iwata et al. | |
| 5,641,227 A | 6/1997 | Geyer | |
| 5,770,906 A | 6/1998 | Hazelton et al. | |
| 6,485,188 B1 | 11/2002 | Dougherty | |
| 6,543,938 B2 * | 4/2003 | Dittenhofer | 384/455 |
| 2005/0216084 A1 | 9/2005 | Fleischmann et al. | |
| 2012/0008894 A1 | 1/2012 | Plasse | |

* cited by examiner

COMBINATION THRUST FLANGE AND THRUST PLATE

CROSS REFERENCE TO RELATED APPLICATIONS

This application is a continuation in part of U.S. patent application Ser. No. 10/012,980, filed Nov. 5, 2001, which claims the benefit of U.S. Provisional Application Ser. No. 60/246,394 filed on Nov. 7, 2000, which are incorporated herein by reference in their entirety.

FIELD OF THE INVENTION

The present invention relates to thrust bearings, and more particularly, to a combination rotating thrust plate and thrust shaft flange intended to support a rotating shaft in a screw extruder and to a thrust bearing assembly incorporating the combination rotating thrust plate and thrust shaft flange.

BACKGROUND OF THE INVENTION

Extruders generally force molten material through an extruder barrel utilizing a turning screw. During operation, flights of the screw engage the molten material, moving it along the length of the barrel. Typically, a restriction to flow such as a die defining the desired shape for the extruder material is mounted onto the end of the barrel. The force created by the screw on the material causes it to flow through the restriction. The movement of the material via the action of the screw, as well as the channeling of the material through the restriction, tends to generate very high reaction forces that are transmitted to the device employed to drive and support the screw.

In general, the extruder screw is mounted to an output thrust shaft that in turn forms part of a gear box. The thrust shaft is typically supported by roller-type bearings with the above-described reaction force being absorbed by a thrust bearing also in communication with the thrust shaft. A thrust bearing typically consists of a series of rolling elements sandwiched between two thrust plates. The thrust plates and rollers transfer the reaction forces generated by the processing of the material through the extruder to the gear reducer housing. Due to the magnitude of the reaction force, known thrust plates are generally not stiff enough to withstand the load imposed thereon and must be replaced frequently.

FIG. 1 shows a conventional gear box design which incorporates a thrust shaft flange (36) to further stiffen and uniformly distribute the thrust load over a rotating thrust plate (34) in contact with the thrust shaft (20). During operation, the direction of thrust is against the flange (36) as indicated by the arrow labeled "T" shown in FIG. 1, and the force generated from the thrust is transmitted via the peripheral lip (42) on the thrust shaft (20) to the thrust shaft flange (36) which in turn transmits the force to the thrust bearing (41). A drawback associated with the above-described flange and thrust bearing arrangement is that a separate thrust shaft flange (36) and thrust plate (34) must be provided, resulting in an increased likelihood for machining and/or assembly error as well as the possibility of localized areas of high stress due to inexact mating of the thrust shaft flange and thrust plate surfaces (35) and (37). Moreover, the requirement for a separate thrust flange (36) adds to the expense of the extruder gearbox (38). Based on the foregoing, there is a need for a one-piece, combination thrust shaft flange and thrust plate design which would eliminate the difficulties and drawbacks associated with the above-described prior art configuration, and be compatible with prior art gear boxes (38) as shown in FIG. 1.

SUMMARY OF THE INVENTION

The present invention relates to a thrust bearing assembly, including a single-piece thrust plate and thrust shaft flange. The single-piece thrust plate and thrust shaft flange includes a generally cylindrical body portion defining a rotating base surface and a lateral surface; and a frustoconical body portion defining a frustoconical surface and a base surface. The single-piece thrust plate and thrust shaft flange also includes a bore extending through the cylindrical body portion and the frustoconical body portion. The bore extends substantially perpendicular to the rotating base surface. The bore has a first bore section and a second bore section. The second bore section is adjacent to the rotating base surface and has a smaller diameter than the first bore section. A lip extends between the first and second bore sections. The first bore section, the second bore section and the lip are configured to receive a thrust shaft and accommodate axial thrust forces transmitted from the thrust shaft.

The thrust bearing assembly includes a bearing assembly in operable communication with the generally cylindrical body portion. The bearing assembly supports rotation of the thrust shaft and includes a plurality of first rolling elements. The bearing assembly includes a bearing cage configured to retain the first rolling elements. The thrust bearing assembly further includes a stationary plate having a passage extending therethrough complementary to the second bore section. The thrust shaft is received by the passage and the stationary plate engages the bearing assembly. A plurality of second rolling elements is disposed between the bearing cage and the thrust shaft. The plurality of second rolling elements supports rotation of the bearing cage around the thrust shaft.

In another aspect of the present invention, the second rolling elements are needle bearings. In addition, the second rolling elements can be retained by another cage.

BRIEF DESCRIPTION OF THE DRAWINGS

The novel features of the described embodiments are specifically set forth in the appended claims; however, embodiments relating to the structure and process of making the present invention, may best be understood with reference to the following description and accompanying drawings.

DETAILED DESCRIPTION OF PREFERRED EMBODIMENTS

Figure 1:
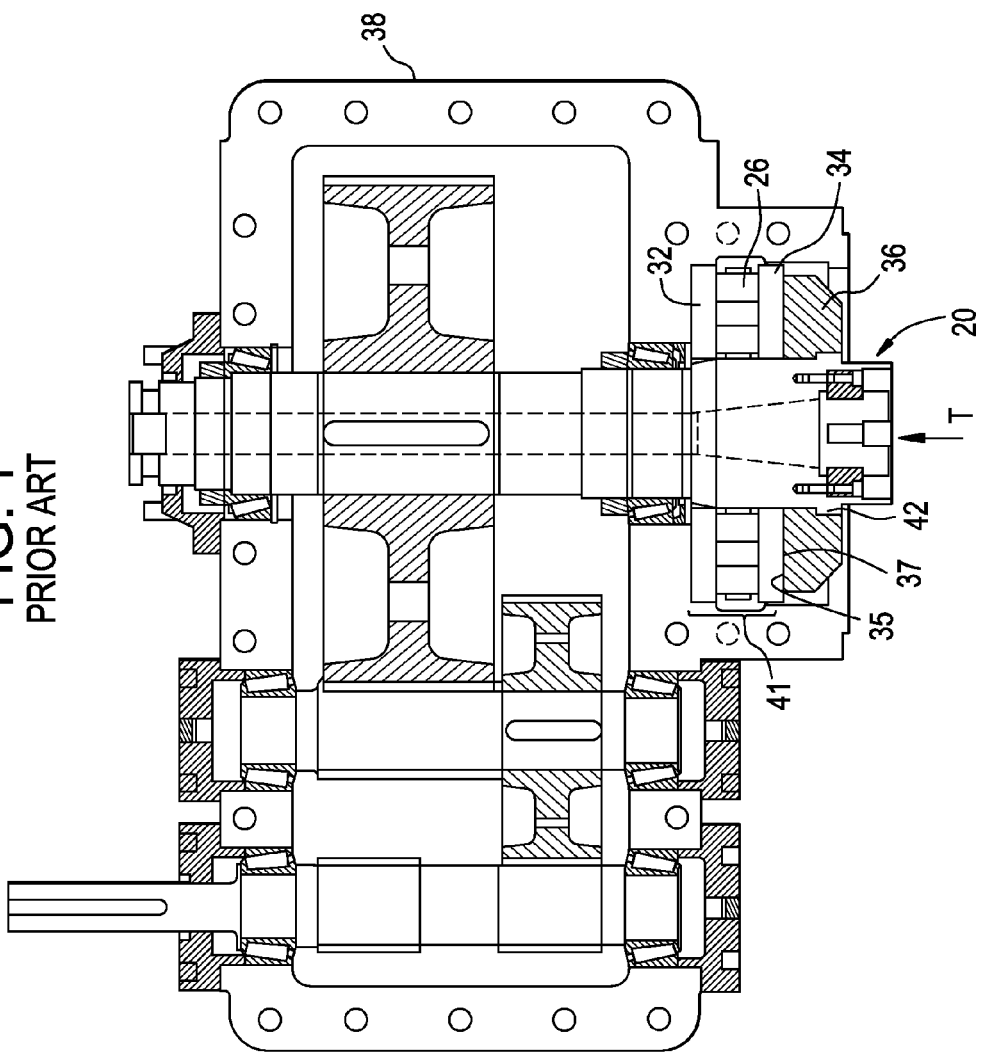
FIG. 1 a sectional side view of a conventional gear box (38) design showing a thrust bearing (41) with a rotating thrust plate (34) reinforced by a thrust shaft flange (36) of the prior art.
Figure 2:
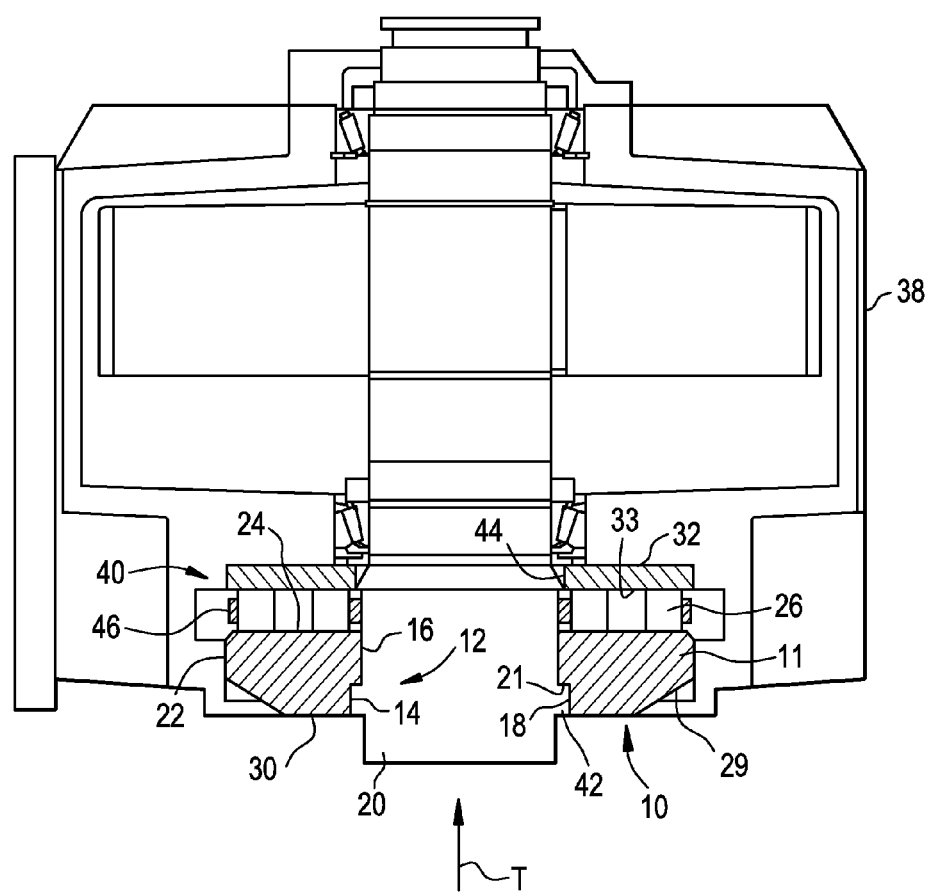
FIG. 2 is a sectional side view of an embodiment of the present invention showing a thrust bearing (40) with a combination thrust plate and thrust shaft flange (10).
Figure 3:
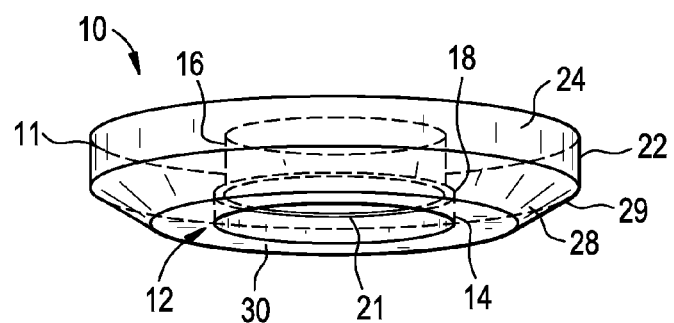
FIG. 3 is a perspective view from the bottom of a combination thrust plate and thrust shaft flange (10) according to the present invention.

As shown in FIG. 2, the present invention includes a combination thrust plate and thrust shaft flange (also referred to herein as a rotating flange plate combination) generally designated by the reference number (10). The rotating flange plate combination (10) replaces the conventional rotating thrust plate (36) and thrust flange (34) shown in FIG. 1. The rotating flange plate combination (10) has a generally cylindrical body (11) which includes a generally cylindrical body portion (22), a frustoconical body portion (29), and a bore (12) extending therethrough. The generally cylindrical body portion (22) has a rotating base surface (24) and a lateral surface (23). The frustoconical body portion (29) has a frustoconical surface (28) and a base surface (30). The bore (12) extends through the cylindrical and frustoconical body portions (22) and (29) from the rotating base surface (24) to the base surface (30) of the frustoconical body portion (29).

Figure 4:
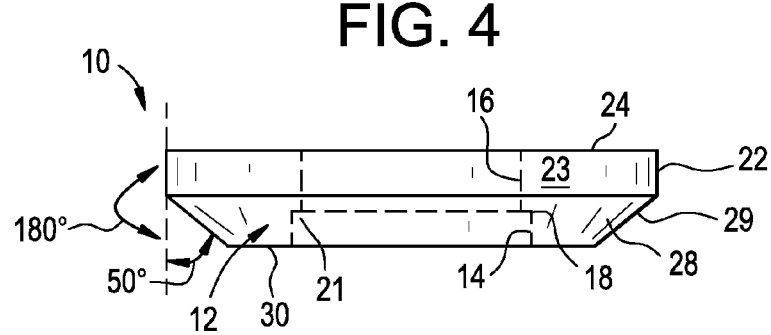
FIG. 4 is a side view of the combination thrust plate and thrust shaft flange (10) of FIG. 3.
Figure 5:
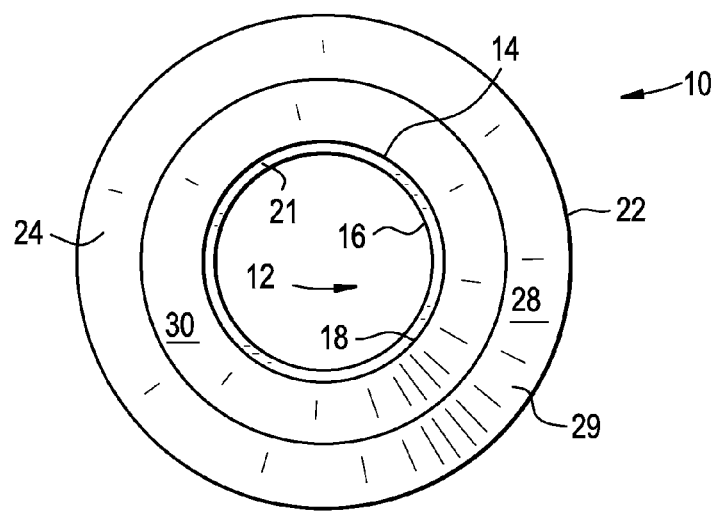
FIG. 5 is a bottom view of the combination thrust plate and thrust shaft flange (10) of FIG. 3.

As shown most clearly in FIGS. 4 and 5, the bore (12) has a first bore section (14) and a second bore section (16). The first and second bore sections (14) and (16) meet at a junction (18) thereby defining a lip (21). Preferably, the bore (12) extends substantially parallel to the lateral surface (23); however, it is critical that the bore (12) extends perpendicular to the rotating base surface (24). The second bore section (16), which is adjacent the rotating base surface (24), has a smaller diameter then the first bore section (14).

The frustoconical portion (24) extends inwardly from the generally cylindrical portion (22). Optimally, the frustoconical surface (28) extends at an angle of about 230 degrees from the lateral surface (23) as illustrated in FIG. 4. Furthermore, it is preferable that the rotating base surface (24) is adapted to engage a rolling element (26) of a thrust bearing assembly (40).

During operation, thrust forces generated by the extruder and indicated in FIG. 2 by the arrow labeled "T" are exerted against the thrust shaft (20), which in turn is coupled to an extruder screw (not shown). These thrust forces are then transmitted via a peripheral lip (42) of the thrust shaft (20) to the flange plate combination (10). The thickness of the flange plate combination (10), as well as its material of construction, will determine its stiffness or load bearing capability.

Figure 7:
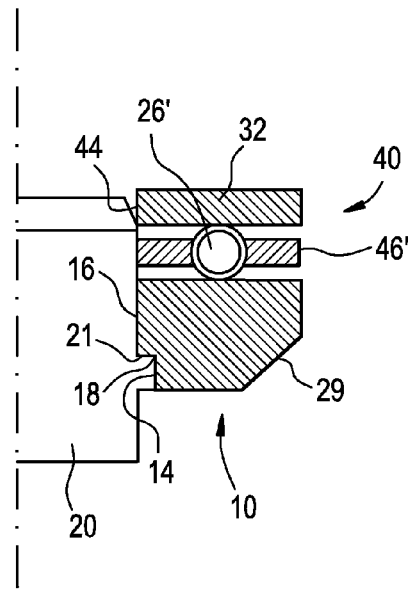
FIG. 7 is a partial, sectional side view of an alternate embodiment of a thrust bearing (40) having a rotating combination thrust plate and thrust shaft flange (10) according to the present invention.

Also encompassed by the present invention is the thrust bearing assembly (40) which supports the rotating thrust shaft (20) as shown in FIGS. 2 and 7. The assembly (40) has flange plate combination (10), a stationary plate (32) and rolling elements (26), for example cylindrical rolling elements. The rolling elements (26) are evenly interspersed between the flange plate combination (10) and the stationary plate (32).

The stationary plate (32) has a generally cylindrical shape with a stationary bore (44) extending therethrough complimentary to the second bore section (16) of the flange plate combination (10). The stationary plate (32) has a stationary base surface (33). The stationary base surface (33) is adapted to engage the rolling elements (26). The rolling elements (26) are evenly interspersed between the flange plate combination (10) and the stationary plate (32).

Figure 6:
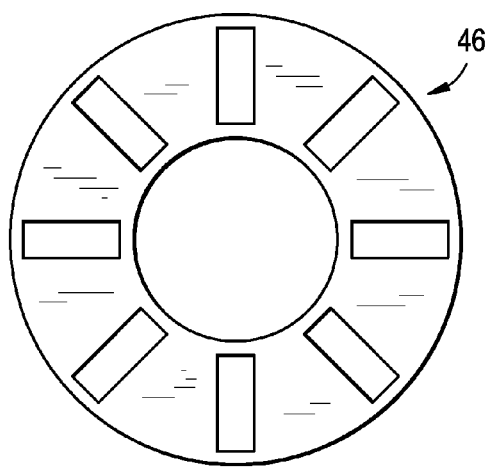
FIG. 6 is a top view of the bearing cage (46) of FIG. 1.
Figure 8:
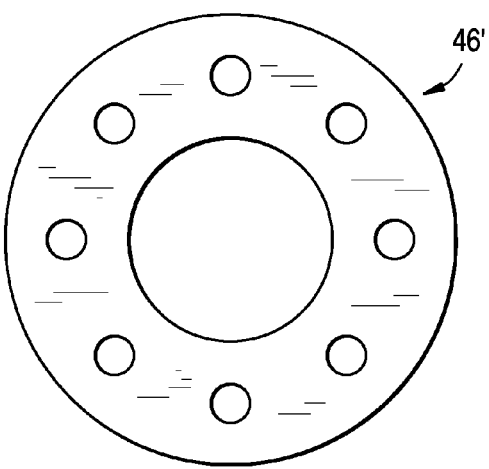
FIG. 8 is a top view of the bearing cage (46') of FIG. 7.

A bearing cage (46) for retaining the rolling elements (26) in position to assure free radial movement of the flange plate combination (10) is preferably provided. As shown in FIG. 2, the rolling elements (26) may be roller bearings, for example cylindrical or needle bearings. FIG. 6 shows a bearing cage (46) for retaining the rolling elements (26). Additionally, spherical ball bearings (26') and a ball bearing cage (46') may be used, as shown in FIGS. 7 and 8. It is understood that the present invention is not limited to the specific bearing cage and rolling elements shown. The bearing cages used have complimentary shapes to the shape of the stationary plate and the rotating flange plate combination used with complimentary bores extending through the bearing cage and stationary plate which is complimentary to the shape of the second bore section (16) of the rotating flange plate combination (10).

An advantage of the present invention is that the thrust bearing assembly includes fewer parts and is therefore easier to maintain, compared to prior art thrust bearings such as that described above with reference to FIG. 1.

A further advantage of the present invention is that the rotating flange plate combination (10) has a greater stiffness, or load bearing capacity, compared to prior art rotating thrust plates and thrust flanges of the same material. The thrust bearing assembly (40) of the present invention also has a greater load bearing capacity.

Figure 9:
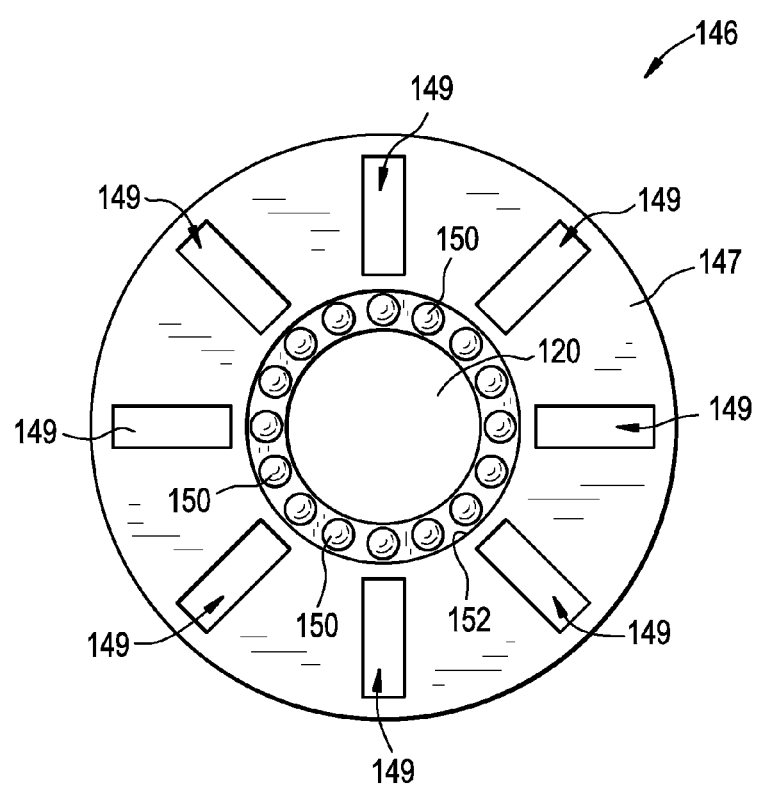
FIG. 9 is a top view of an embodiment of a bearing cage having a bearing positioned in a bore thereof.
Figure 10:
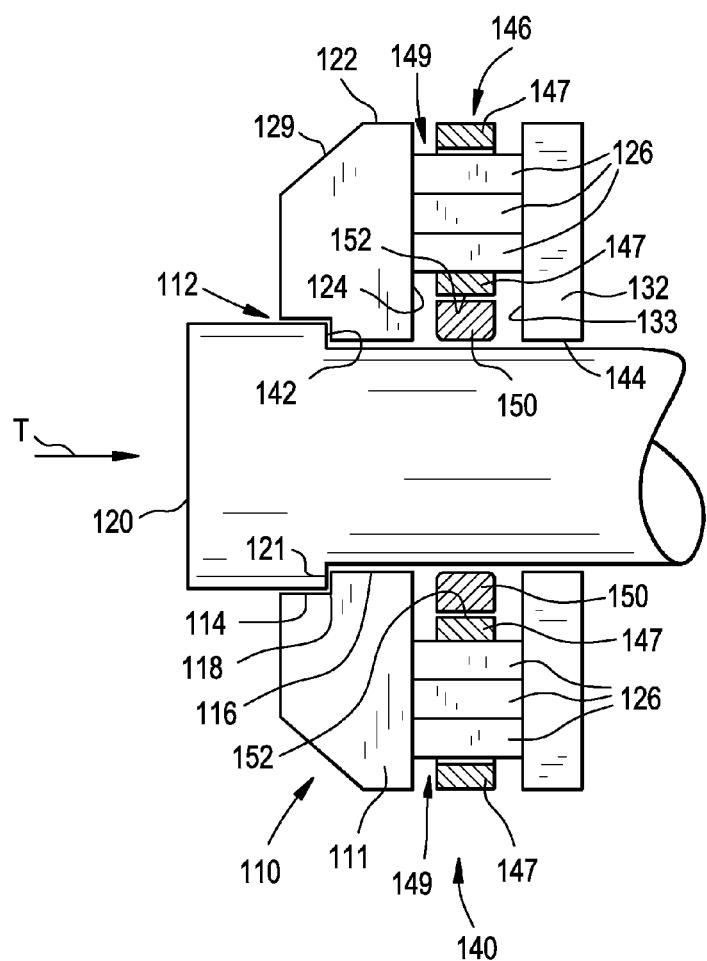
FIG. 10 is a side sectional view of the bearing cage of FIG. 9, positioned on a thrust shaft.

The bearing cage illustrated in FIGS. 9 and 10 is similar to the bearing cage shown in FIGS. 2 and 6. Accordingly like elements are assigned like reference numbers, preceded by the numeral 1. As shown in FIGS. 9 and 10, a first bearing cage 146 defines a frame 147 defines a plurality of pockets 149, for example eight pockets, for receiving and retaining first rolling elements such as cylindrical roller bearings 126 (not shown in FIG. 9) therein. The first bearing cage 146 is rotatably supported on the thrust shaft 120 by a plurality of second rolling elements 150 positioned between the thrust shaft and a bore 152 defined by an inside surface of the first bearing cage. For example, FIG. 9 illustrates sixteen second rolling elements 150 between the thrust shaft 120 and the first cage 146. However, any number of second rolling elements 150 can be employed without departing from the broader aspects of the present invention. In one embodiment the second rolling elements 150 are needle bearings. In one embodiment, the second rolling elements 150 are rotatably held in predetermined positions by a second cage (not shown). The predetermined positions include, for example, equally spaced positions located circumferentially around the shaft 120. The plurality of second rolling elements 150 can reduce friction and wear between the bearing cage 146 and the shaft 120. In addition, the plurality of second rolling elements 150 support the weight of the first cage 146 for rotation about the thrust shaft 120.

It is to be understood that the present invention is not limited to the embodiments described above, but encompasses any and all embodiments within the scope of the following claims. Accordingly, it is to be understood that the present invention has been described by way of example, and not by limitation.

What is claimed is:

1. A thrust bearing assembly, comprising:
a single-piece thrust plate and thrust shaft flange, comprising,
    a generally cylindrical body portion defining a rotating base surface and a lateral surface,
    a frustoconical body portion defining a frustoconical surface and a base surface,
    a bore extending through said cylindrical body portion and said frustoconical body portion, and
    said bore extending substantially perpendicular to said rotating base surface, said bore having a first bore section and a second bore section, said second bore section being adjacent said rotating base surface and having a smaller diameter than said first bore section, and a lip extending between said first and second bore sections, wherein said first bore section, said second bore section and said lip are configured to receive a thrust shaft and accommodate axial thrust forces transmitted from said thrust shaft;

a bearing assembly in operable communication with said generally cylindrical body portion and supporting rotation of said thrust shaft, said bearing assembly comprising a plurality of first rolling elements and a bearing cage configured to retain said first rolling elements;

a stationary plate having a passage extending therethrough complementary to said second bore section and through which said thrust shaft is received, said stationary plate engages said bearing assembly; and a plurality of second rolling elements disposed between said bearing cage and said thrust shaft and configured to support rotation of said bearing cage around said thrust shaft, the plurality of second rolling elements being cage-weight-supporting rolling elements that rollingly engage the bearing cage and the shaft, the bearing cage being spaced apart from the thrust shaft by the plurality of second rolling elements, the plurality of second rolling elements further configured to support rotation of the bearing cage around the thrust shaft and to support the weight of the bearing cage.

2. The rotating combination thrust plate and thrust shaft flange of claim 1, wherein said second rolling elements are needle bearings.

3. The thrust bearing assembly of claim 1, wherein said second rolling elements are retained in another cage.

4. The rotating combination thrust plate and thrust shaft flange of claim 1, wherein said bore extends substantially parallel with said lateral surface.

5. The rotating combination thrust plate and thrust shaft flange of claim 1, wherein said frustoconical body portion has a frustoconical surface which extends at an angle of about 230 degrees from said lateral surface.

6. The rotating combination thrust plate and thrust shaft flange of claim 1, wherein said rotating base surface directly engages said first rolling elements of said thrust bearing assembly.

7. The thrust bearing assembly of claim 1, wherein said first rolling elements comprise ball bearings.

8. The thrust bearing assembly of claim 1, wherein said stationary base surface directly engages said first rolling elements.

9. A thrust bearing assembly, comprising:
a single-piece thrust plate and thrust shaft flange, comprising,
  a generally cylindrical body portion defining a rotating base surface and a lateral surface,
  a frustoconical body portion defining a frustoconical surface and a base surface,
  a bore extending through said cylindrical body portion and said frustoconical body portion,
  said bore extending substantially perpendicular to said rotating base surface, said bore having a first bore section and a second bore section, said second bore section being adjacent said rotating base surface and having a smaller diameter than said first bore section, and a lip extending between said first and second bore sections, wherein said first bore section, said second bore section and said lip are configured to receive a thrust shaft and accommodate axial thrust forces transmitted from said thrust shaft, and
  said thrust shaft configured in a horizontal position;

a bearing assembly in operable communication with said generally cylindrical body portion and supporting rotation of said thrust shaft, said bearing assembly comprising a plurality of first rolling elements and a bearing cage configured to retain said first rolling elements;

a stationary plate having a passage extending therethrough complementary to said second bore section and through which said thrust shaft is received, said stationary plate engages said bearing assembly; and a plurality of second rolling elements disposed between said bearing cage and said thrust shaft and configured to support rotation of said bearing cage around said thrust shaft, the plurality of second rolling elements being cage-weight-supporting rolling elements that rollingly engage the bearing cage and the shaft, the bearing cage being spaced apart from the thrust shaft by the plurality of second rolling elements, the plurality of second rolling elements further configured to support rotation of the bearing cage around the thrust shaft, to support a radially downward component of the weight of the bearing cage, and to support the weight of the bearing cage.

* * * * *